United States Patent [19]

Ewald

[11] 4,072,011
[45] Feb. 7, 1978

[54] HYDRAULIC BRAKE BOOSTER
[75] Inventor: Jerome T. Ewald, South Bend, Ind.
[73] Assignee: The Bendix Corporation, South Bend, Ind.
[21] Appl. No.: 670,513
[22] Filed: Mar. 24, 1976
[51] Int. Cl.² ............................................. B60T 13/20
[52] U.S. Cl. ........................................ 60/555; 60/548; 60/553; 60/561; 60/562; 60/582; 91/412
[58] Field of Search ................. 60/548, 553, 555, 560, 60/591, 547, 562, 582, 593, 561; 91/412

[56] References Cited
U.S. PATENT DOCUMENTS

| | | | |
|---|---|---|---|
| 2,799,140 | 7/1957 | Osborne | 60/555 |
| 2,945,352 | 7/1960 | Stelzer | 60/555 |
| 3,053,052 | 9/1962 | Garrison | 60/548 |
| 3,194,019 | 7/1965 | Lepelletier | 60/560 |
| 3,677,007 | 7/1972 | Goscenski | 60/548 |
| 3,786,636 | 1/1974 | Kobashi | 60/548 |
| 3,798,905 | 3/1974 | Tennis | 60/555 |
| 3,879,946 | 4/1975 | Farr | 60/535 |
| 3,937,127 | 2/1976 | Baker | 60/553 |
| 3,979,912 | 9/1976 | Kuromitsu | 91/412 |

Primary Examiner—William R. Cline
Assistant Examiner—Abraham Hershkovitz
Attorney, Agent, or Firm—Leo H. McCormick, Jr.; Ken C. Decker

[57] ABSTRACT

A brake booster for use in a braking system having a control valve which is responsive to a hydraulic output force created by manually moving a piston in a bore of a master cylinder. The hydraulic output force actuates the control valve which proportionally directs a portion of the fluid output of a pump which supplies a power steering gear with hydraulic fluid, into the bore. This portion of the output of the pump acts on the piston and provides an auxiliary force for moving the piston through which the hydraulic output force is created. When the hydraulic output force of the brake booster reaches a predetermined value, the control valve engages a stop member to limit the diversion of the fluid output from the pump and thereby assure that a minimal quantity of the fluid output is continually available to operate the power steering gear.

9 Claims, 3 Drawing Figures

HYDRAULIC BRAKE BOOSTER

BACKGROUND OF THE INVENTION

Hydraulic power brake boosters have been proposed as a replacement for pneumatic power brake boosters because of a reduction in available space under the hoods of some vehicles. In an effort to provide a uniform braking force corresponding to an operator input force, a hydraulic ratio changer as disclosed in U.S. Pat. No. 3,831,491 was introduced into such brake boosters. Unfortunately, in these hydraulic ratio changers, the change in movement of the input pedal varies with the change in volume of a hydraulic fluid in the control chamber. In an effort to compensate for volumetric change of the fluid in the control chamber, fluid communication with a reservoir is established when the input force from the operator terminates. Unfortunately, such compensation is dependent upon the position of an actuation member and not the pressure producing piston.

The hydraulic brake booster in U.S. Pat. No. 3,838,629 discloses a manually operated ratio changer having a plunger which pressurizes fluid in a closed chamber whenever an input force is applied to the boost operating mechanism. The pressurized fluid is communicated to a spool valve which in turn controls the communication of hydraulic fluid under pressure. The hydraulic fluid under pressure moves a piston in a master cylinder and provides an energizing force for operating the wheel brakes in a vehicle.

SUMMARY OF THE INVENTION

I have devised a hydraulic brake booster means having a control valve which is activated by an operational output force created through the movement of a piston means in a bore by a manual input force. The control valve diverts a portion of the output of a hydraulic pump into the bore which acts on the piston means to provide an auxiliary force through which the operational output is created.

The piston means separates the bore into a power chamber, a first pressurizing chamber and a second pressurizing chamber. The first pressurizing chamber is connected to a first set of wheel brakes through a first flow-through-chamber associated with the control valve. The second pressurizing chamber is connected to a second set of wheel brakes through a second flow-through-chamber associated with the control valve means. A first plunger means separates the first flow-through-chamber from the second flow-through-chamber. A second plunger means associated with the control valve separates the first flow-through-chamber from a control chamber. The control chamber is connected to the hydraulic pump associated with the power steering gear of the vehicle.

The movement of the piston means in the bore creates a first operational output in the first pressurizing chamber. The first operational output is communicated through the first flow-through-chamber to the first set of wheel brakes. This first operational output moves the second plunger means to proportionally direct a portion of the flow of the pump from the control chamber into a distribution chamber for communication to the power chamber. The output of the pump in the power chamber acts on the piston means to create said auxiliary force.

If a malfunction should occur which prevents the communication of the first operational output to the first set of wheel brakes, the manual input force still moves the piston means to create an operational output in the second pressurizing chamber which is communicated through the second flow-through-chamber to the second set of wheel brakes. The operational output in the second flow-through-chamber moves the first plunger means which in turn moves the second plunger means. Movement of the second plunger means proportionally directs the flow of fluid from the control chamber into the distribution chamber and thereafter creates said auxiliary force in the power chamber. Thus a power assist of the hydraulic pump is assured even though a malfunction could render the movement of the piston means in either pressurizing chamber ineffective.

It is therefore the object of this invention to provide a brake booster with a control means for diverting a portion of the output of a hydraulic pump to aid in moving a piston in a pressurizing chamber.

It is another object of this invention to provide a brake booster with means whereby a manual input force transmitted to a pressurizing piston is augmented by a hydraulic input force to produce an operational output force.

It is a still further object of this invention to provide a brake booster with a fail safe actuation means through which the output of a pump is proportionally added to a manual input for operating a piston means in a pressurizing chamber.

It is a still further object of this invention to provide a brake booster with a piston means, which is initially moved by a manual input force to create an output signal, and a plunger means which is responsive to the output signal, for diverting a portion of the output of a hydraulic pump to the piston means and thereby provide an auxiliary force for creating the output signal.

These and other objects will be apparent from reading this specification and viewing the drawings.

DETAILED DESCRIPTION OF THE PREFERRED EMBODIMENT

Figure 1:
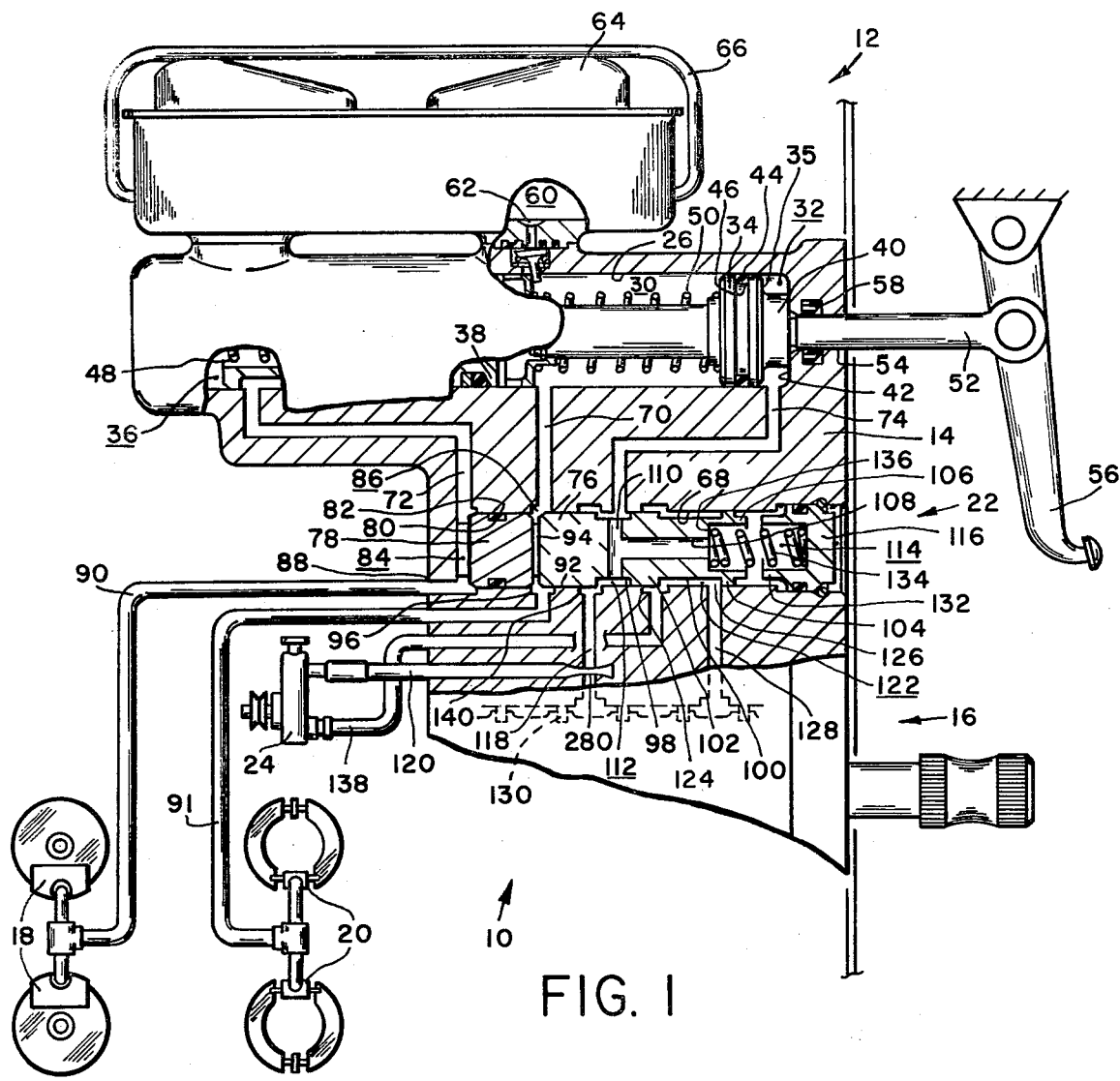
FIG. 1 is a schematic view of a common fluid hydraulic braking and steering system for use in a vehicle, showing a broken sectional view of a brake booster incorporating the teachings of my invention.

The common fluid hydraulic braking and steering systems 10, shown in FIG. 1, has a brake booster means 12 integrally located in a common housing 14 with a power steering gear 16. The brake booster means 12 is connected to the front wheel brakes 18 and to the rear wheel brakes 20 through a valve means 22 located in the housing 14. Similarly, the power steering gear 16 is connected to an engine driven pump means 24 through the valve means 22. The valve means 22 responds to the output of the brake booster means 12 for diverting a portion of the output of the pump means 24 into the brake booster means 12 to thereby provide an auxiliary force for operating the brake booster means 12.

In more particular detail, the brake booster means 12 includes a bore 26 located in the housing 14. The bore 26 is divided into a first pressurizing chamber 30 by a first piston 34 and a second pressurizing chamber 36 by a second piston 38. A projection 40 holds the first piston 34 away from the first end 42 of the bore 26 to establish a power chamber 32. A seal 44 located in groove 46 in the first piston 34 separates the first pressurizing chamber 30 from the power chamber 32.

A return spring 48 located in the second pressurizing chamber 36 acts through the second piston 38 and actuation spring 50 to urge the projection 40 on the first piston 34 against the first end 42 of the housing 14.

A push rod 52 which extends through opening 54 in the housing 14 has a first end attached to the first piston 34 and a second end attached to the brake pedal 56. A seal 58 located in opening 54 prevents communication between the power chamber 32 and the atmosphere.

The first pressurizing chamber 30 and the second pressurizing chamber 36 are connected to a reservoir 60 by compensator ports 62 (only one shown) to maintain the fluid in bore 26 at a constant volume.

A cap 64 which covers the reservoir 60 is held against the housing 14 by a bail wire 66.

The first pressurizing chamber 30 is connected to a second bore 68 in the housing 14 by a passage 70. The second pressurizing chamber 36 is connected to the second bore 68 by a passage 72. The power chamber 32 is connected to the second bore 68 by a passage 74.

The bore 68 retains the valve means 22. The valve means 22 includes a first plunger 76 and a second plunger 78.

The first plunger 76 has a peripheral surface 92 which substantially fills the bore 68. A projection 94 holds the first plunger 76 away from the second plunger 78 to establish a first actuation or flow-through-chamber 86 in the bore 68. The second plunger 78 in conjunction with the bottom of the bore 68 forms a second actuation or flow-through-chamber 84. The first flow-through-chamber 86 has an outlet port 96 through which passage 70 is connected to the rear wheel brakes 20 by conduit 91. The second flow-through-chamber 84 has an outlet port 88 for connecting passage 72 with conduit 90 going to the front wheel brakes 18. A first groove 98 on the first plunger 76 is separated from a second groove 100 by a first land 102. A second land 104 located adjacent end 106 provides a bearing surface to maintain the first plunger 76 in axial alignment in the bore 68. A stepped axial bore 108 extends from the end 106 to a cross bore 110. The cross bore 110 provides communication from a distribution chamber 112, formed by groove 98 and bore 68, and a reaction chamber 114, formed adjacent end 106 by end cap 116 and the bore 68. The distribution chamber 112 is connected to the power chamber 32 by passage 74 and to a return conduit 120 by passage 118. The return conduit 120 carries fluid from the power steering gear 16 to a reservoir in pump 24.

A control chamber 122 is formed by groove 100 on the first plunger 76 and bore 68. The control chamber 122 has an inlet port 124 which is connected to the outlet of the pump 24 and an outlet port 126 connected by passage 128 to bore 31 which retains the rotary valve 130 of the steering gear 16.

The end cap 116 has a guide 132 for retaining a spring or resilient means 134 in the reaction chamber 114. The spring 134 abuts shoulder 136 in the stepped bore 118 to hold shoulder 94 against the first plunger 76.

MODE OF OPERATION OF THE PREFERRED EMBODIMENT

In a vehicle equipped with the common fluid hydraulic braking and steering systems 10, when the engine driven pump 24 is in operation, a fluid is constantly flowing to the power steering gear 16 by way of the supply conduit 138, control chamber 122, passage 128 and return conduit 120. Resilient means or spring 134 holds the first plunger 76 against the second plunger 78 since the pressure of the fluid flowing from the pump acts equally on the first and second lands 102 and 104 in the first plunger 76.

When the operator of the vehicle desires to make a brake application, an input force is applied to pedal 56 which moves push rod 52 to provide a linear input force for moving the first piston 34. Initial movement of the first piston 34 closes compensator port 62 to allow a first pressurizing force to develop in chamber 30. This first pressurizing force is simultaneously transmitted through passage 70 to the second flow-through-chamber 86 for distribution to the rear wheel brakes 20 and to the second piston 38.

The first pressurizing force in the first flow-through-chamber 86 moves the first plunger 76 in opposition to the resilient means 134 to initially close the relief port 140. As the first pressurizing force increases by movement of the first piston 34 in the pressurizing chamber 30, the first land 102 proportionally restricts the flow of the fluid under pressure from the pump 24 into the control chamber 122 and allows a portion of the fluid to flow into the distribution chamber 112 for communication through passage 74 to the power chamber 32. The restriction of the flow from the entrance port 124 into the control chamber 122 causes a pressure build up of the fluid in the distribution chamber 112 and in the power chamber 32. The pressure of the fluid in the power chamber 32 acts on the back side 35 of the first piston 34 to provide an auxiliary force for moving the piston 34 and pressurizing the fluid in the first pressurizing chamber 30.

The pressure of the fluid in the power chamber 32 also acts on the diameter of the push rod 52 to inform the operator of the intensity of the braking force being developed in the first and second pressurizing chambers 30 and 36.

The movement of the second piston 38 in the second chamber 36 creates a second pressurizing force in chamber 36. The second pressurizing force is transmitted through the passage 72 into the first flow-through-chamber 84 before being communicated to the front wheel brakes 90.

With the first pressurizing force in the first flow-through-chamber 86 and the second pressurizing force in the second flow-through-chamber 84, the second plunger 76 remains stationary. At the same time, the fluid pressure in the distribution chamber 112 is communicated into the reaction chamber 114 by way of the axial and cross bores to balance the pump forces across the first plunger 76. The spring 134 and the differential pressure across the land 102 offer a resistance to movement of the first plunger 76 by the first pressurizing force to establish the communication of the output of the pump 24 to the power chamber 32.

End 106 on the first plunger 76 is adapted to engage guide 132 before the first land 102 can completely interrupt the flow of hydraulic fluid from the pump or through the control chamber 122. Thus, the rotary valve 130 of the power steering gear 16 is always assured of an available fluid power source to aid in the turning of the wheels on the vehicle.

When the braking input force on pedal 56 terminates, return spring 48 urges the first piston toward end 42 to reduce the pressure in the first pressurizing chamber 30 to create a pressure differential across first plunger 76 between the distribution chamber 112 and the first flow-through-chamber 86. This pressure differential allows spring 134 to move land 102 past the inlet port 124 and terminate the flow of fluid into the control chamber 112 from the pump 24. Further movement of the first plunger 76 allows groove 98 to establish a flow path between passage 74 and the relief port 140 in order that the fluid under pressure in the distribution chamber 32 can be dumped into the reservoir of pump 24.

In the event of a malfunction in production of the first pressurizing force, the manual input is transmitted through the first piston 34 to move the second piston 38. Movement of the second piston 38 creates a fluid pressure in the second pressurizing chamber 36. The fluid pressure in chamber 36 is communicated through passage 72 into the second flow-through-chamber 84 before being transmitted to the wheel brakes 18. With fluid pressure in the second flow-through-chamber 84 and no pressure in the first flow through chamber 86, a pressure differential is created across the second plunger 78. This pressure differential causes the second plunger 78 to move and operate the first plunger 76 in the same manner as described above to provide an auxiliary input force for moving the first piston 34.

DETAILED DESCRIPTION OF THE ALTERNATE EMBODIMENT

Figure 2:
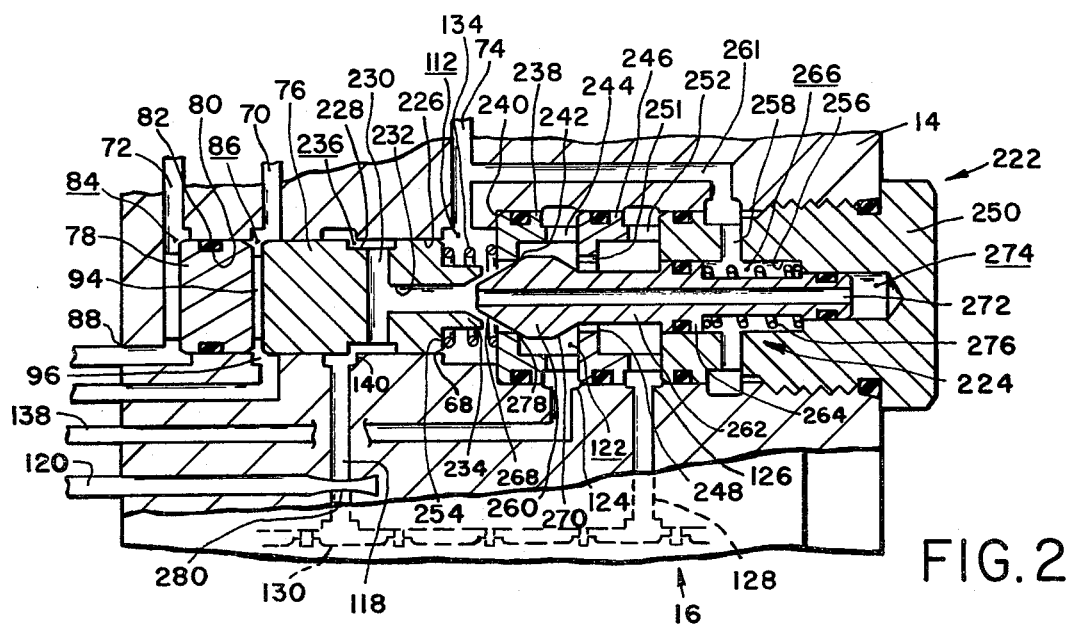
FIG. 2 is a sectional view of a second control means for use with the brake booster of FIG. 1.
Figure 3:
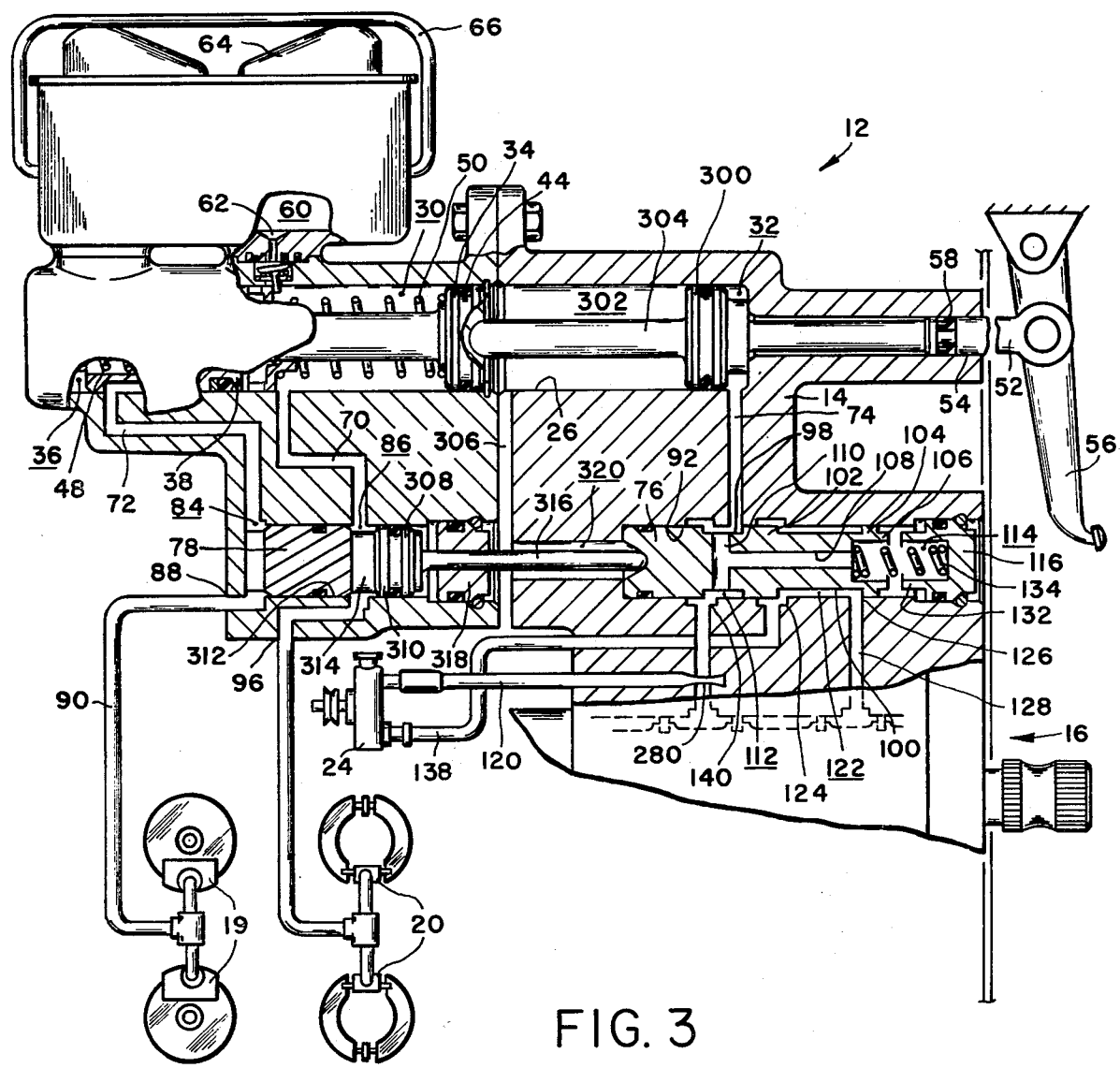
FIG. 3 is a schematic view of a two-fluid hydraulic braking and steering system for use in a vehicle, showing a broken sectional view of a brake booster incorporating the teachings of my invention.

In the embodiments shown in FIGS. 2 and 3 like parts described in the embodiment of FIG. 1 are identified by the same number.

The valve means 222 shown in FIG. 2 has a poppet means 224 which engages the first plunger means 76 to control the flow of the fluid under pressure to the power chamber 32 in response to a braking signal in either the first or second flow-through-chamber 84 and 86 to provide the auxiliary operational force which moves the first piston 34.

The first plunger 76 has a peripheral surface 226 which substantially fills the second bore 68. A groove 228 in conjunction with the second bore 68 forms an outlet chamber 236 adjacent the outlet port 140. An axial bore 232 extends from face 234 to a cross bore 230 for connecting the control chamber 112 with the outlet chamber 236.

A first disc 238 located against shoulder 240 separates the distribution chamber 112 from the control chamber 122. The first disc 238 has an axial opening 242 through which the control chamber 122 is connected to the distribution chamber 112. The first disc 238 has a series of projections 244 which locates a second disc 246 within the control chamber 122. The second disc 246 has an axial opening 248 with a series of grooves 251 (only one being shown) through which the output of the pump 24 is communicated from the inlet port 124 to the outlet port 126.

An end cap 250 attached to the housing 14 engages projections 252 on the second disc 246 to fix the location of the first disc 238 and the second disc 246 within the stepped axial bore 68. A spring or resilient means 134 located between the first disc 238 and a shoulder 254 on the first plunger 76 holds shoulder 94 against the second plunger 78 to provide a free flow path between the distribution chamber 112 and the outlet chamber 236. The end cap 250 has a stepped bore 256 with a cross bore 258 connected to passage 260 in the housing 14.

The poppet valve means 224 has a head 260 attached to a stem 262. The stem has a shoulder 264 which slides in bore 256. The shoulder 264 seals the first reaction chamber 266 from the control chamber 122. The head 260 has a first face 268 and a second face 270 which mates with the first disc 238 and second disc 246 to control the flow of the output of the pump 24 through the control chamber 122. The stem 262 of the poppet has an axial bore 272 which communicates a second reaction chamber 274 with the distribution chamber 112 and the outlet chamber 236. A spring 276 located in the first reaction chamber 266 acts on shoulder 264 to urge the first face 268 against seat 278 and prevent communication between the control chamber 122 and the distribution chamber 112.

When a braking signal is communicated to either the first or second flow-through-chambers 84 and 86, the first plunger 76 moves after the resistance of spring 134 is overcome. Initial movement of the first plunger 76 seats face 234 on face 278 to interrupt communication between the distribution chamber 112 and the outlet chamber 236. As the braking signal from the first piston 34 or second piston 38 intensifies, spring 276 is overcome and a portion of the output from pump 24 directed from the control chamber 122 into the distribution chamber 112. This fluid under pressure is directed from the control chamber 112 through passage 74 to the power chamber 32 for providing the auxiliary input force.

This same fluid under pressure is communicated through passage 261 into the first reaction chamber 266 for balancing the pressure forces across the stem 262. When the braking signal is sufficient to move the second face 270 against the second disc 246, grooves 251 still permits a portion of the output of pump 24 to continue to flow from the inlet port 124 to the outlet 126 to provide minimal fluid flow for operating the steering gear 16.

With a reduction in the braking signal, spring 276 moves the stem 262 toward the first disc 238 to proportionally reduce the flow of the output of the pump 24 into the distribution chamber 112. When the braking signal is terminated, spring 276 seats face 268 on seat 278 to prevent communication between the control chamber 122 and the distribution chamber 112. At the same time, spring 134 moves face 234 on the first plunger 76 away from face 268 and allows the fluid in the power chamber 32 to flow to the outlet chamber 236. The action of venturi 280 in the return conduit 120 assures that the fluid in the outlet chamber is returned to the reservoir in the pump 24. In addition, the venturi 280 prevents any back pressure in the power steering return 120 from being communicated through the control chamber 112 into the power chamber 32 and creating a false brake signal.

The embodiment shown in FIG. 3 is utilized when the hydraulic fluid in the brake booster 12 is not compatible with the fluid in the power steering gear 16. To prevent contamination between the brake booster 12 and the steering gear 16, it is necessary to provide a piston 300 on the end of the push rod 52. The piston 300 separates the bore 26 into a power chamber 32 and an atmospheric chamber 302. The piston 300 has an extension 304 which engages the rear of the first piston 34. A passage 306 connects the atmospheric chamber 302 with the atmosphere.

An actuation plunger 308 is located between the second flow-through-chamber 86 and the distribution chamber 112. The actuation plunger 308 has a cylindrical body 310 which substantially fills the second bore 312. A shoulder 314 on the actuation plunger 308 engages the second plunger 78 while a stem 316 passes through a plug 318 into atmospheric chamber 320 before engaging the first plunger 78.

The mode of operation of the embodiment of FIG. 3 is exactly the same as that of the embodiment of FIG. 1. The input from the operator, applied to pedal 56, linearly moves the push rod 52 which in turn moves the first piston 34 to produce a first pressurizing force in the first pressurizing chamber 30. The first pressurizing force acts on the actuation plunger 308 and moves the first plunger 76 to restrict the flow of the hydraulic fluid from pump 24. A portion of the restricted output of the pump 24 is communicated into the distribution chamber 112 for communication through passage 74 to the power chamber 32. The hydraulic fluid in the power chamber 32 acts on piston 300 to provide an auxiliary force for moving the first piston and thereby meet an operational demand as indicated by the input from the operator on pedal 56.

I claim:

1. A combined wheel brake actuator and power steering mechanism for a vehicle comprising:

a housing having a first bore, a second bore and a third bore located therein;

a first piston located in said first bore for establishing a first pressurizing chamber and a power chamber therein;

a second piston located in said first bore for establishing a second pressurizing chamber therein;

a first plunger located in said second bore for establishing a first flow through chamber, a distribution chamber and a control chamber, said first flow through chamber being connected to said first pressurizing chamber by a first passage and to a first outlet port, said first outlet port being connected by a first conduit to a first set of wheel brakes on the vehicle, said distribution chamber being connected to said power chamber by a distribution passage and to a reservoir by a relief conduit, said control chamber being connected by a first supply conduit to receive the fluid output of a pump and to said third bore through a second supply conduit;

a second plunger located in said second bore for establishing a second flow through chamber therein, said second flow through chamber being connected to said second pressurizing chamber by a second passage and to a second outlet port, said second outlet port being connected by a second conduit to a second set of wheel brakes on the vehicle;

resilient means located in said second bore for urging said first plunger into engagement with said second plunger to permit the fluid output of the pump to freely flow through said control chamber;

a rotary valve located in said third bore for controlling the communication of the fluid output of the pump in said second supply conduit to a steering gear in response to an operator steering input to aid in turning the wheels of the vehicle, said third bore being connected to said relief conduit by a relief passage to permit the fluid output in the third bore to be returned to the reservoir of the pump;

actuator means responsive to an operator brake input force for moving said first piston to create a first fluid actuation pressure in said first pressurizing chamber, said first fluid actuation pressure being communicated through said first passage, said first flow through chamber, said first outlet port, and said first conduit to initiate operation of said first set of wheel brakes, said first fluid actuation pressure in said first flow through chamber moving said first plunger in opposition to said resilient means to interrupt communication between said distribution chamber and said relief passage and thereafter restrict the flow of the fluid output of the pump through the control chamber and proportionally allow a portion of the fluid output of the pump in the control chamber to flow into said distribution chamber for communication to said power chamber, said portion of the fluid output of the pump in the power chamber acting on said first piston to provide an auxiliary input force for moving said first piston in the first pressurizing chamber to create an operational brake fluid pressure; and stop means located in said second bore for limiting the movement of said first plunger and correspondingly that portion of the fluid output of the pump diverted from said control chamber to assure that minimal fluid output from the pump is continually available to operate said steering gear.

2. The combined wheel brake actuator and power steering mechanism as recited in claim 1 further including:

seal means for separating said first pressurizing chamber from said power chamber to prevent contamination of the fluid in said first pressurizing chamber with the fluid output from the pump.

3. The combined wheel brake actuator and power steering mechanism as recited in claim 2 wherein said actuator means includes:

push rod means extending through said housing and engaging said first piston in said power chamber, said portion of the fluid output of said pump communicated to said power chamber acting on said push rod means to provide an operator with an indication of the auxiliary input force acting on said first piston.

4. The combined wheel brake actuator and power steering mechanism as recited in claim 3 wherein said first piston contacts said second piston to create a second actuation fluid pressure in said second pressurizing chamber should a malfunction occur in said first set of wheel brakes that impair the creation of said first fluid pressure, said actuation fluid pressure being communicated through said second passage, said second flow through chamber, said second outlet port, and said second conduit to initiate actuation of said second set of wheel brakes, said second actuation fluid pressure in said second flow through chamber acting on said second plunger and moving said first plunger to proportionally divert the fluid output from said control chamber into said power chamber through said distribution chamber and sustain the communication of the auxiliary input force in said power chamber.

5. The combined wheel brake actuator and power steering mechanism as recited in claim 4 wherein said first plunger includes:

a cylindrical body having a first end located said first flow through chamber and a second end located in said second bore adjacent said stop means, said cylindrical body having a first groove separated from a second groove by a land, said cylindrical body having an axial bore extending from said second end to a cross bore located in said first groove, said first actuation fluid pressure acting on said first end to move said first groove out of communication with said relief passage and into communication with said first supply conduit as said land approaches a seat to restrict the flow of the fluid output through the control chamber to second supply conduit to thereby divert a portion of fluid output of the pump into said first groove for communication to said distribution chamber, said portion of the fluid output bein simultaneously communicated from the distribution chamber to the power chamber and to said second bore through said cross bore and axial bore, said portion of the fluid output in said second bore acting on said second end to oppose the first actuation pressure and the operational brake fluid pressure and thereby correlate the movement of the cylindrical body with movement of the first piston by the operator input force.

6. The combined wheel brake actuator and power steering mechanism, as recited in claim 4 wherein said first plunger includes:
   a cylindrical body having a first end located in said first flow through chamber and a second end located in the distribution chamber, said cylindrical body means having an axial bore extending from said second end to a cross bore located between the first end and second end;
   a disc located in said distribution chamber having a first seat and a second seat thereon; and
   a poppet valve having a stem with a head on a first end and a bearing surface on a second end, said head having a first face and a second face located between the first seat and the second seat on said disc, said resilient means in the second bore acting on said stem to urge the first face against the first seat, said first fluid actuation pressure acting on the first end of the cylindrical body and moving said second end against said first face to interrupt communication between the distribution chamber and the relief passage through the cross bore and axial bore, said first fluid actuation pressure further moving the cylindrical body and the poppet valve in opposition to said resilient means to move the first face off the first seat and move the second face toward the second seat thereby restricting the flow of the fluid output of the pump through the control chamber and allowing flow through the first seat into the distribution chamber.

7. The combined wheel brake actuator and power steering mechanism, as recited in claim 6 wherein said disc includes:
   a series of grooves adjacent said second seat to further limit the diversion of the fluid output from the pump and thereby assure that a sufficient flow of fluid is available to operate said steering gear.

8. The combined wheel brake actuator and power steering mechanism, as recited in claim 5 further including:
   an actuation piston located in said first bore between said first pressurizing chamber and said power chamber, said actuation piston having a stem thereon for engaging said first piston and establishing an atmospheric chamber in said first bore;
   a first seal attached to said first piston for separating the first pressurizing chamber from an atmospheric chamber; and
   a second seal attached to said actuation piston for separating the power chamber from said atmospheric chamber, said first and second seal preventing the fluid in the first pressurizing chamber from being contaminated by the fluid in the power chamber.

9. The combined wheel brake actuators and power steering mechanism, as recited in claim 8 wherein said first plunger includes:
   a first section located in said flow through chamber;
   a plug located in said second bore for separating said first flow through chamber from an atmospheric chamber therein;
   a stem attached to said first section and extending through said plug into the second bore; and
   a second section having a cylindrical body with a first end located in the atmospheric chamber and a second end located in a reaction chamber in the second bore, a first groove located in the control chamber and a second groove located in the control chamber, said cylindrical body having an axial bore extending from the said second end to a cross bore located at said first groove, said resilient means in the second bore acting on said second end to hold the first end in contact with said stem, said first actuation pressure acting on said first section to move the second section and restrict the flow of the fluid output through the control chamber while allowing a portion of the fluid output to flow through the distribution for communication through said distribution passage to the power chamber.

* * * * *